June 8, 1965  R. W. HERVEY  3,187,612
METHOD FOR SIMULTANEOUSLY CUTTING OVERLAPPING
BOARDS FROM A SINGLE SHEET
Filed Dec. 18, 1962  2 Sheets-Sheet 1

Robert W. Hervey
INVENTOR.

Robert W. Hervey
INVENTOR.

United States Patent Office 3,187,612
Patented June 8, 1965

3,187,612
METHOD FOR SIMULTANEOUSLY CUTTING OVERLAPPING BOARDS FROM A SINGLE SHEET
Robert W. Hervey, 2233 Calhoun Way, Stockton, Calif.
Filed Dec. 18, 1962, Ser. No. 245,621
2 Claims. (Cl. 83—5)

This invention relates to a novel method and apparatus for simultaneously cutting overlapping boards from a single sheet of material. The apparatus of the instant invention and the method steps accomplished thereby form a plurality of generally parallel grooves in the opposite sides of a single sheet of material in a manner whereby the single sheet of material is separated into a plurality of elongated boards with the adjacent edges of the boards, without rearranging the boards relative to each other, being formed for overlapping engagement with each other.

The machine also includes means whereby the adjacent marginal edge portions of the boards, when overlappingly engaged with each other, will form V-grooves in one side of a wall section constructed of the paneling members. Still further, the machine also includes means by which the portions of the paneling members defining the V-grooves may have stain applied thereto as the single sheet of material is divided into the paneling members by the grooves formed in opposite sides thereof so as to enable the V-grooves formed by the paneling members to be more distinctly defined.

The main object of this invention is to provide a machine for cutting a plurality of paneling members from a single sheet of material in a manner whereby adjacent ones of the paneling members may be overlappingly engaged with each other for compact storage and shipment without first rearranging the boards.

A further object of this invention, in accordance with the immediately preceding object, is to proivde a machine for cutting a plurailty of paneling members from a single sheet of material during a single movement of the sheet of material in a manner whereby the adjacent portions of corresponding side faces of the paneling members will define V-grooves.

A further object of this invention, in accordance with the immediately preceding object, is to provide a machine which will, during the process of cutting a plurality of boards from a single sheet of material, apply darkening strain to the portions of the paneling members defined by the boards and defining V-groove joints in order that the V-groove joints may be more clearly defined.

A final object of this invention to be specifically enumerated herein is to provide a machine in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the machine of the instant invention showing the manner in which it may be utilized to cut a plurality of paneling members from a single sheet of material in a manner such that the separate paneling members, after having been cut, may be overlappingly engaged with each other by merely laterally moving adjacent ones of the paneling members toward each other and without rearranging the boards relative to each other;

Figure 7:
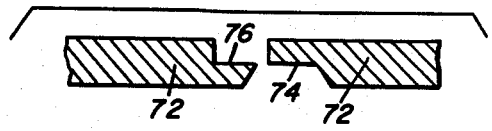
Figure 8:
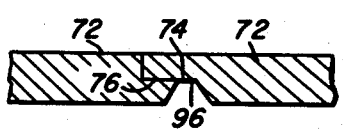

FIGURE 7 is a fragmentary diagrammatical transverse sectional view showing the manner in which the individual paneling members are positioned relative to each other immediately after having been cut from a single sheet of material in accordance with the present invention; and FIGURE 8 is a transverse diagrammatical sectional view similar to that of FIGURE 7 of the drawings but with the individual paneling members showing in overlapping engagement with each other so as to define a longitudinally extending grooving of a desired cross sectional design.

With reference now more specifically to the drawings, the numeral 10 generally designates the machine of the instant invention. The machine 10 includes a support housing generally referred to by the reference numeral 12 including a top wall 14. The top wall 14 rotatably journals a pair of shafts 16 and 18 above its upper surface by means of corresponding pairs of journal blocks 20 and 22 respectively secured to the upper surface of the top wall 14 in any convenient manner and a pair of shafts 24 and 26 beneath its lower surface 28 by means of suitable journal blocks 30 and bearing members 32 formed in one side wall 40 of the housing 12. The shafts 16 and 26 comprise guide roller shafts having guide rollers 42 and 44 mounted thereon at points spaced axially thereof and the shafts 18 and 24 comprise cutter shafts having cutter wheels 46 and 48 mounted thereon as at points spaced axially therealong.

Figure 1:
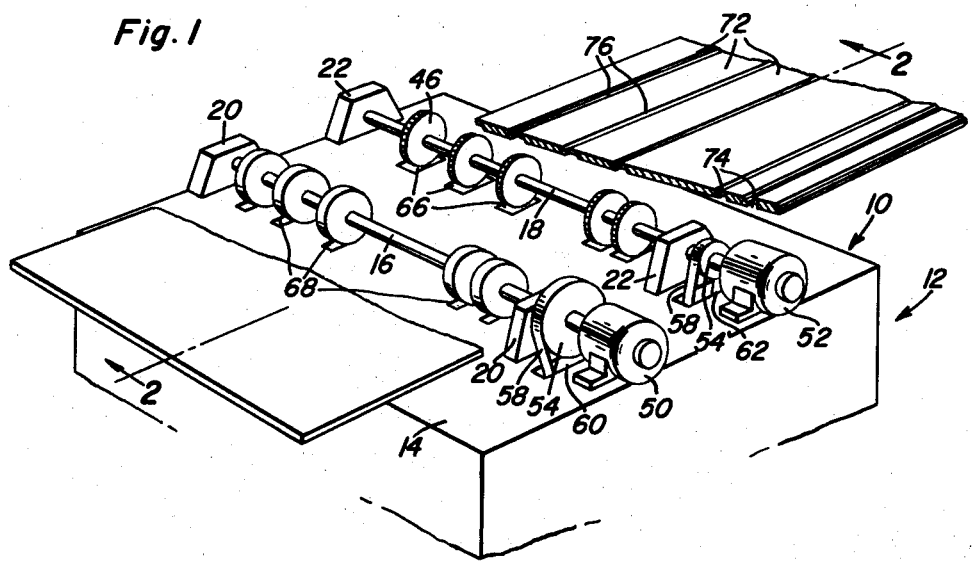

From FIGURE 1 of the drawings, it may be seen that the shafts 16 and 18 comprise extensions of the output shafts of a pair of electric motors 50 and 52 supported from the top wall 14 and that the shafts 16 and 18 are provided with pulleys 54, 54' drivingly connected to a pair of pulleys 56 and 56' on the shafts 24 and 26 respectively aligned with the pulleys 54, 54' by means of a pair of endless flexible members 58.

The top wall 14 is provided with a pair of openings 60 and 62 through which the endless flexible members 58 pass and also with sets of openings or slots 66 and 68 through which the outer peripheries of the cutter wheels 46 and 48 project. It will be noted that the shafts 18 and 24 are spaced longitudinally of the top wall 14 and that a plane of movement is defined between the guide rollers 42 and 44 and the cutter wheels 46 and 48.

Figure 2:
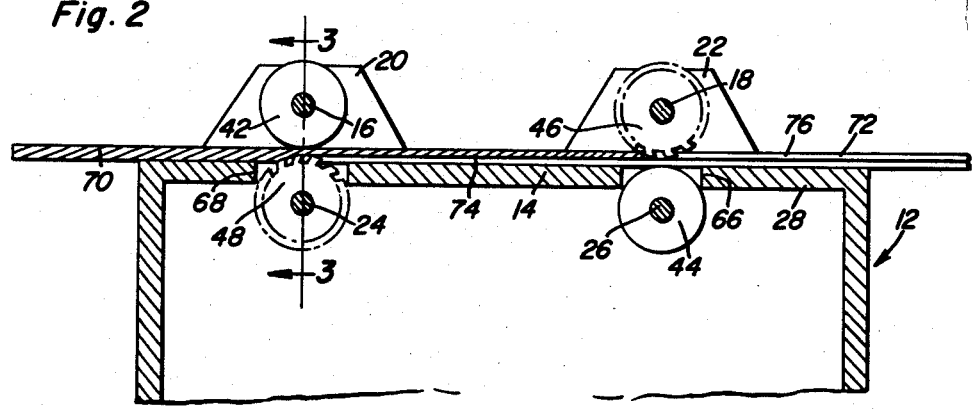
FIGURE 2 is a fragmentary enlarged vertical sectional view taken substantially upon the plane indicated by the section line 2—2 of FIGURE 1.

The sheet 70 of material which is to be cut into a plurality of paneling members 72 is guidingly supported between the guide rollers 42 and 44 for longitudinal shifting movement through the plane of movement defined between the guide rollers and cutter wheels. It may be seen from FIGURE 2 of the drawings, that the guide rollers 42 and 44 oppose the cutter wheels 48 and 46 respectively and that the sheet 70 may be moved from left to right as viewed in FIGURE 2 of the drawings in order to have the grooves 74 first formed therein and the grooves 76 subsequently formed in the sheet 70 in order to separate or cut the sheet 70 into the plurality of paneling members 72.

Figure 4:
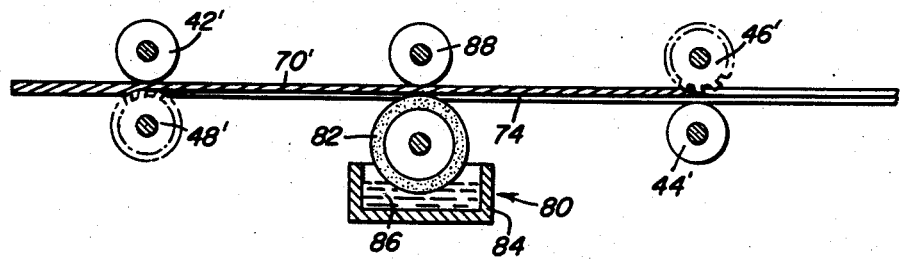
FIGURE 4 is a fragmentary longitudinal vertical sectional view similar to that of FIGURE 2 but showing a modified form of machine adapted to apply a coating of staining material or the like to the adjacent marginal portions of the paneling members, which when overlappingly engaged with each other, will form V-grooves.

From FIGURE 4 of the drawings, there may be seen a modified machine generally referred to by the reference numeral 80 which includes guide rollers 42' and 44' corresponding to guide rollers 42 and 44 and cutter wheels 46' and 48' corresponding to the cutter wheels 46 and 48. However, the machine 80 also includes applicating rollers 82 whose lower peripheral portions are disposed in a reservoir 84 containing staining fluid 86. The upper periphery of each roller 82 is disposed in contacting relation with the portions of the sheet 70' defining the corresponding groove 74' formed therein corresponding to the groove 74. In addition, a guide roller 88 is rotatably journaled from the machine 80 in a manner so as to oppose the roller 82 and be disposed in rolling contacting relation with the surface of the sheet 70' remote from the portions of the sheet 70 engaged by the application roller 82.

With attention now directed to FIGURES 5 through 8 of the drawings, it may be seen that the cutter wheels 48 form the grooves 74 and that each groove 74 is provided with inwardly convergent longitudinal side walls 90 and 92 and also that the groove 74 includes one portion 94 which overlaps and extends into the corresponding groove 76 formed by one of the cutter wheels 46. This extra deep and overlapped portion of the groove 74 communicates the grooves 74 and 76 so that the sheet 70 is separated into the plurality of paneling members 72.

It may be seen that the corresponding ones of the grooves 74 and 76 are spaced laterally relative to each other and that the portions of the bottom of the grooves 74 and 76 adjacent the overlapped and communicated portions thereof are of complementary cross-sectional shape so as to be adapted to be overlapped in surface to surface contacting relation as shown in FIGURE 8 of the drawings. Further, it will be noted that the depth of the portions of the bottoms of the grooves 74 and 76 adjacent the communicated portions thereof total the approximate thickness of the individual paneling members 72 formed by the grooves 74 and 76. Still further, it may be noted that depth of the interfitting portions of the grooves 74 and 76 is equal to approximately one-half the thickness of the individual paneling members formed by the grooves 74 and 76. Still further, from FIGURE 8 of the drawings, it may be seen that the width of the bottom of the groove 74 is greater than the width of the groove 76 whereby the innermost ends of the inwardly divergent sides 90 and 92 of the groove 74 will be spaced from each other when adjacent ones of the paneling members 72 are disposed in overlapping relation as viewed in FIGURE 8 of the drawings in order to form a flat bottom V-groove 96 between adjacent surfaces of adjacent ones of the paneling members 72.

Figure 3:
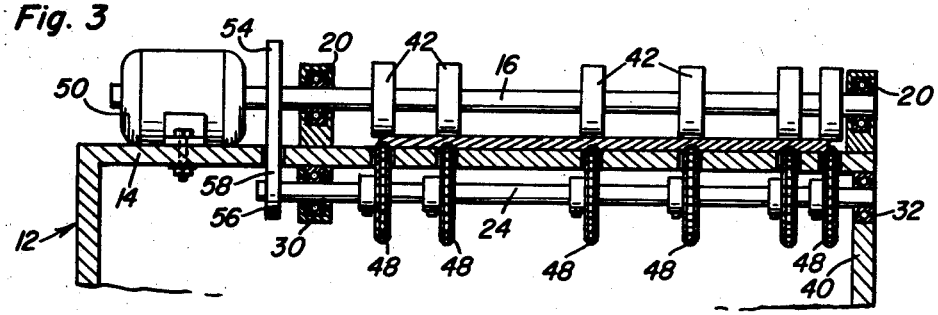
FIGURE 3 is a fragmentary transverse sectional view taken substantially upon the plane indicated by the section line 3—3 of FIGURE 2.

From FIGURE 3 of the drawings, it may be seen that the machine 10 includes cutter wheels 48 disposed on opposite sides thereof which have their innermost halves positioned to form corresponding halves of the grooves 74 which could be formed thereby in order that the appropriate corresponding surfaces of the flat bottom V-groove may be formed in the remote side surfaces of the underportion of the opposite side paneling members 72. In addition, it is to be further noted that the machine 10 also includes cutter wheels 46 corresponding to the opposite side cutter wheels 48 whereby the sheet 70 may be properly cut along its opposite side edges in accordance with the objects of the instant invention.

Figure 5:
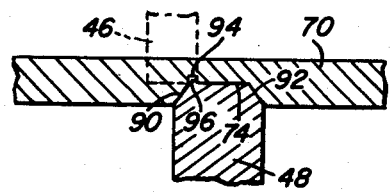
FIGURES 5 and 6 are diagrammatic transverse vertical sectional views showing the manner in which successive cutting operations are formed on the single sheet of material being cut into individual paneling members.
Figure 6:
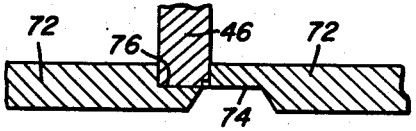

With attention now directed to FIGURES 5 and 6, it may be seen that the cutter wheels 46 form the grooves 76 with parallel sides and with a bottom which is disposed at substantially right angles to the sides. However, the cutter wheels 48 are each provided with extensions 96 for forming the deepen portion of the grooves 74 that communicate the grooves 74 with the grooves 76.

It is to be noted that the machine 10 could comprise several separate components if desired and that the rollers 42 and 48 could be parts of one component, the rollers 82 parts of a second component and the rollers 44 and 46 parts of a third component.

The sheet 70 may be constructed of thin lightweight material whereby a number of paneling members 72 sufficient to panel a room may be packaged in a small lightweight package. Further, by staining the edge portions of adjacent ones of said paneling members 72 forming the corresponding groove 74', that groove 74' will be distinctly defined. In addition, the thin material from which the paneling members 72 are formed is dimensionally stable and may be cut with a knife thereby enabling custom fitting of the paneling members in corners and around wall openings to be more readily performed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The method of cutting a plurality of boards from a single sheet of material, which boards are suitable for paneling members and include longitudinal edge portions overlappingly engageable with each other when erected to form a section of paneling members, said method comprising the following steps: cutting a first longitudinal groove in one side of said panel, cutting a second longitudinal groove in the other side of the panel generally paralleling said first groove with the medial plane of said first groove spaced laterally from the medial plane of said second groove, the width of said second groove being greater than the width of the first groove, one longitudinal edge portion of said second groove slightly overlapping the adjacent longitudinal edge portion of the first groove and being slightly deeper than the remainder of said second groove and communicating with the other groove, at least the portions of the bottoms of said grooves adjacent the communicated portions of said grooves being of complementary cross-sectional shape so as to be adapted to overlap each other in substantial full surface to surface contacting relation with each other, and the total depth of said first groove and said remainder of said second groove being equal to the thickness of said sheet material.

2. The method of claim 1 wherein the step of cutting said second groove includes the step of cutting said remainder of said second groove to a depth equal to substantially one-half the thickness of said panel.

References Cited by the Examiner

UNITED STATES PATENTS

| 760,123 | 5/04 | How | 118—38 |
| 2,110,728 | 3/38 | Hoggatt | 144—326 |
| 2,360,247 | 10/44 | MacChesney | 118—38 |
| 2,535,195 | 12/50 | Colucci et al. | 144—136 X |
| 2,846,801 | 8/58 | Brown | 144—326 X |
| 2,907,359 | 10/59 | Lade | 144—136 |

FOREIGN PATENTS

| 979,407 | 12/50 | France. |

ANDREW R. JUHASZ, *Primary Examiner.*